Jan. 26, 1943. E. E. HOLLANDER 2,309,316
ELECTRICAL COLLECTOR
Filed June 5, 1941 2 Sheets-Sheet 1

INVENTOR
Emil E. Hollander,
BY Harry B. Cook,
ATTORNEY

Jan. 26, 1943.  E. E. HOLLANDER  2,309,316
ELECTRICAL COLLECTOR
Filed June 5, 1941  2 Sheets-Sheet 2
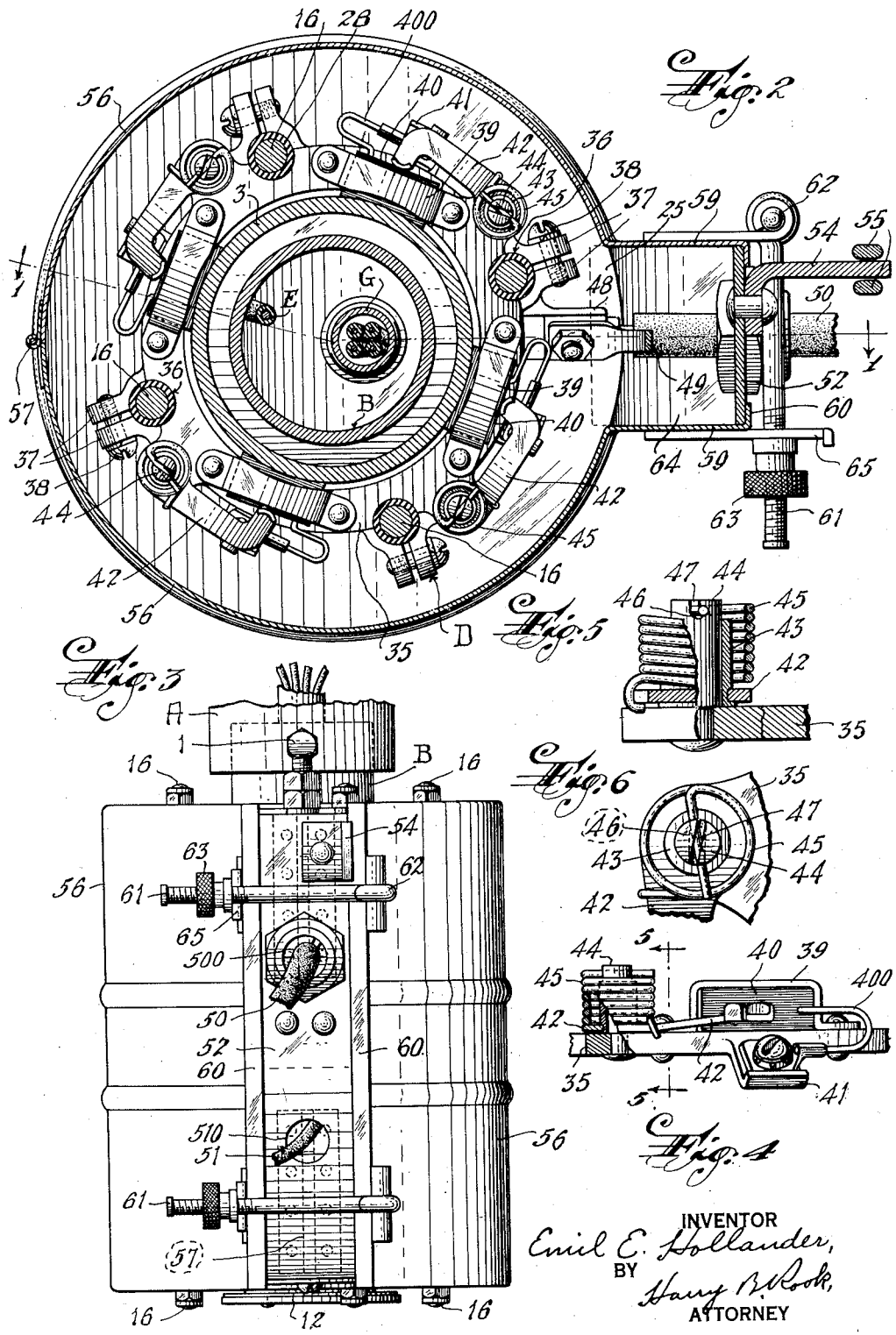
INVENTOR
Emil E. Hollander,
BY
Harry B. Rook,
ATTORNEY Patented Jan. 26, 1943

2,309,316

UNITED STATES PATENT OFFICE 2,309,316

ELECTRICAL COLLECTOR

Emil E. Hollander, Kearny, N. J., assignor to Star Electric Motor Company, Bloomfield, N. J., a corporation of New Jersey Application June 5, 1941, Serial No. 396,684

13 Claims. (Cl. 173—324)

This invention relates in general to collector mechanism for conducting or transmitting electricity from one to the other of two relatively rotatable structures, particularly from a source of electricity in the body of a military motorized tank to a turret rotatably mounted on said body.

The collector mechanism comprises in general a plurality of collector rings fixedly mounted on and insulated from a shaft, a brush holder for each collector ring having brushes frictionally contacting with the corresponding collector ring, a support for mounting said brush holders in relatively rotatable relation to their respective collector rings, and a casing of which said support may be a part for enclosing said collector rings and said brush holders. The shaft may be rotatable with the turret of a motorized tank, and said casing may be mounted in nonrotatable relation to the body of said tank, or vice versa.

One object of the invention is to provide a novel and improved construction, combination and arrangement of said shaft, collector rings, said support and casing, and said brush holders, for mounting said support, casing and brush holders in relatively rotatable relation to said shaft and collector rings, which shall enable rapid and inexpensive production and assembly of the parts and at the same time shall ensure reliability and durability in operation of the collector mechanism.

More specific objects are to provide a collector mechanism of the character described wherein said support for the brush holders and said shaft and collector rings shall be constructed to form novel, simple, inexpensive and durable bearings for relatively rotatable association of said support and said shaft; and to provide a novel, simple and inexpensive sectional casing to permit complete enclosure of and easy and quick access to said collector rings and brush holders and to electrically shield said collector rings and brushes.

The invention further contemplates a novel and improved manner of assembling and mounting said collector rings on and in insulated relation to said shaft, and the invention also is directed to the provision of a novel, simple and sturdy support for the brush holders whereby the latter can be easily and quickly assembled and mounted in insulated relation to the support and in proper relation to their respective collector rings.

Other objects are to provide a novel and improved brush holder and brush mountings therefor to ensure proper yielding contact of the brushes with their respective collector rings and to facilitate assembly and replacement of the brushes; and to obtain other advantages and results as will be brought out by the following description in conjunction with the accompanying drawings in which—

Figure 2 is a horizontal sectional view on the line 2—2 of Figure 1.

Figure 3 is a side elevational view of the mechanism on a reduced scale and viewing the mechanism from the line 3—3 of Figure 1.

Figure 4 is a fragmentary side elevation of one of the brush holders.

Figure 5 is a transverse vertical sectional view on an enlarged scale, taken on the line 5—5 of Figure 4, and Figure 6 is a top plan view of the construction shown in Figure 5.

Figure 1:
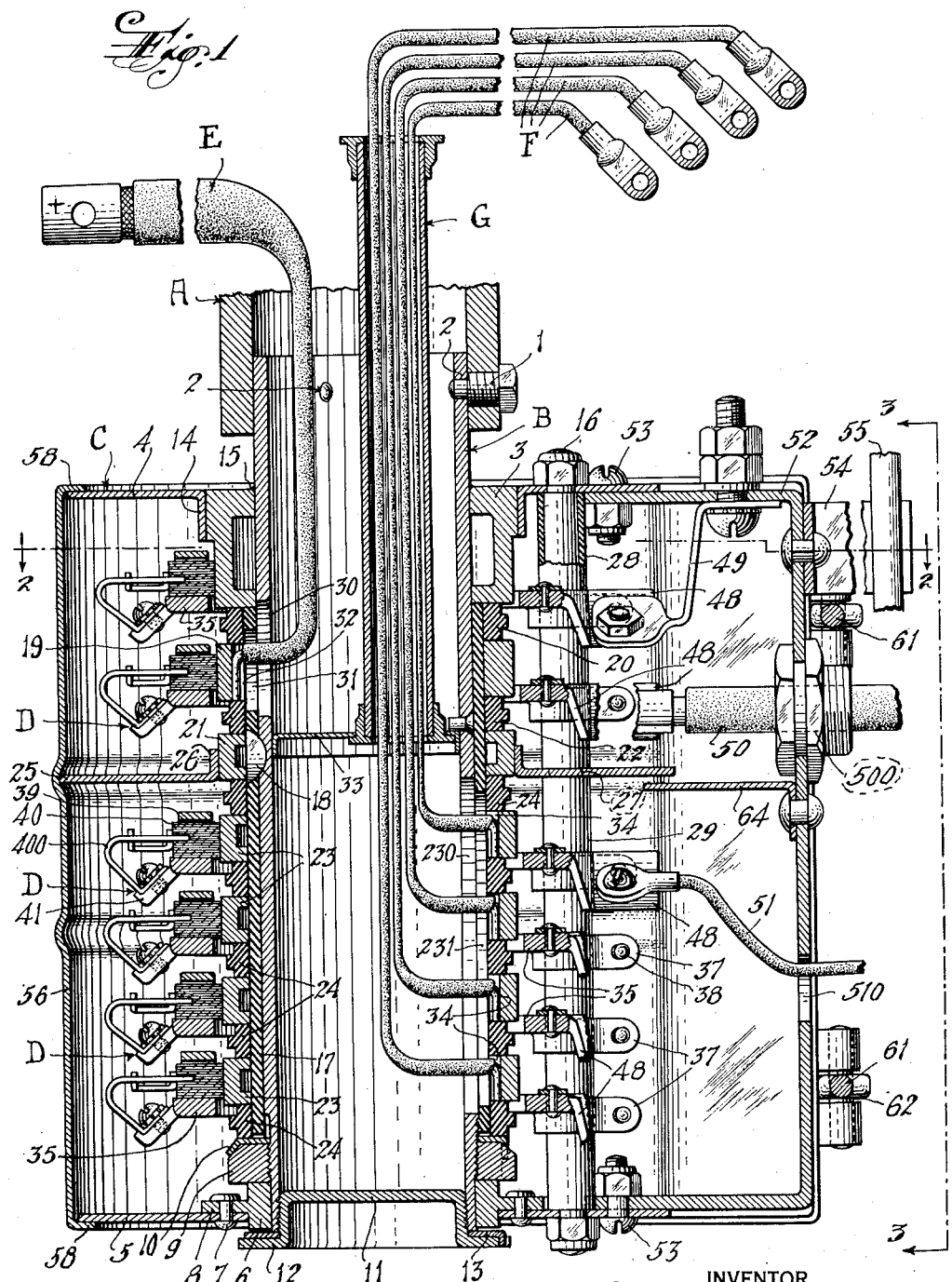
Figure 1 is a vertical longitudinal sectional view through an electrical collector mechanism embodying my invention, taken approximately on the line 1—1 of Figure 2.

Specifically describing the illustrated embodiment of the invention, the reference character A designates a rotatable member such as a depending tubular shaft or sleeve on the turret of a motorized military tank. The shaft B, preferably formed of steel, of the collector mechanism embodying my invention is separably connected to the member A in any suitable manner as by dog point screws 1 in the member A that pass through openings 2 in the shaft B.

Relatively rotatably associated with the shaft B is a support C for a plurality of brush holders D each of which cooperates with a collector ring mounted on the shaft B.

The brush holder support C comprises a top plate 4 preferably formed of sheet steel and circular, and a bottom plate 5 also preferably formed of steel and of substantially the same diameter as the plate 4. The bottom plate 5 has a central opening in which is fitted a thrust bearing bushing 6, preferably formed of brass, said bushing being rigidly secured to the plate 5 as by rivets 7 passing through a peripheral flange 8 on the bushing. The bushing receives the lower end of the shaft B and seated upon the bushing 6 and threaded on the lower end of said shaft is a nut 9 that is locked in position by a lock washer 10. Screwed into the lower end of the shaft is a plug 11 that has a flange 12 underlying the end of the bushing 6 opposite the nut 9, said plug being locked in position by a lock washer 13. The top plate 4 of the support C has a centrally located inturned flange 14 that has a frictional rotatable contact with a combined bearing ring and collector ring 3 that is preferably formed of cast brass and rigidly secured to the shaft B as by brazing at 15.

The two plates 4 and 5 are rigidly connected to each other by a plurality of tie bolts 16, and with this construction it will be observed that the nut 9 and bushing 6 form a bearing for the support C at the lower end of the shaft B, while the flange 14 and collector ring 3 form a bearing for the support on the upper end of the shaft. Relative longitudinal movement of the support and shaft is limited by the nut 9 and the flange 12 of the plug 11.

An insulating sleeve 17, preferably of Bakelite, is fitted upon the shaft B between the collector ring 3 and the nut 9 and is keyed to the shaft as indicated at 18. A main collector ring 19 for the main power circuit is fitted over the top insulating sleeve 17 and held in spaced insulated relation to the collector ring 3 by an insulating ring 20; and an intermediate conducting ring 21 is fitted over the insulating sleeve 17 and held in spaced relation to the collector ring 19 by a second insulating ring 22.

A plurality of collector rings 23 for other circuits, for example radio circuits, etc., are fitted on the insulating sleeve 17. These collector rings 23 are held in spaced insulated relation to each other and the upper and lower rings are held in spaced insulated relation to the intermediate bearing ring 21 and the nut 9, respectively, by the respective insulating rings 24. As shown, the collector ring 19, intermediate bearing ring 21 and collector rings 23, together with the insulating rings 20, 22 and 24, are clamped and held in proper relation to each other and to the sleeve 17 between the end of the top collector ring 3 and the nut 9.

An intermediate plate 25 has a central circular flange 26 closely encircling the intermediate conducting ring 21, and this plate 25 has openings 27 through which pass the respective tie rods 4. The plate is held against movement longitudinally of the tie rods between the ends of insulating sleeves 28 and 29 on each of the tie rods, and serves as electrical shield as will be hereinafter described.

The collector ring 19 is connected to one cable E of the main power circuit, which extends downwardly through the member A and shaft B and has its end passing radially outwardly through registering openings 30 and 31 in the shaft and insulating sleeve 17. The inner periphery of the ring 19 has a groove 32 in which the end of the cable E is seated and soldered.

Each of the collector rings 23 is connected to one cable F of another circuit, for example a radio or telephone circuit, said cable being mounted in a conduit G that is secured in the shaft B by a partition 33 and extends upwardly through the shaft and the rotatable member A into the turret of the tank. Each of the rings 23 preferably has a groove 34 on its inner periphery in which is arranged and soldered the end of the corresponding cable F which passes through registering slots 230 and 231 in the shaft B and the sleeve 17.

One of the brush holders D is provided for each of the collector rings 3, 19 and 23, and inasmuch as the brush holders are identical in construction, only one thereof need be described.

The brush holder comprises a ring 35 surrounding its corresponding collector ring in spaced relation thereto and having a plurality of transverse holes 36 each of a diameter to nicely receive or fit or slide over the insulating sleeve of one of the tie bolts 16. For clamping the ring in position on the tie bolts, the ring has a pair of spaced lugs 37 projecting from its outer periphery in juxtaposition to each of the holes 36, with a space between the lugs opening into the corresponding hole 36; and a screw 38 passes transversely through the lugs 37 and is threaded into at least one thereof so that upon tightening of the screw, the walls of the hole 36 will be contracted around the corresponding tie rod. With this construction, each brush holder has in effect a plurality of split clamps which permit easy fitting of the holders over the tie rods and secure clamping of the holders in proper position on the tie rods.

Each brush holder also has a plurality of brush guides 39 in each of which is slidably mounted a brush 40 to frictionally contact with the corresponding collector ring. Each brush has the usual pigtail connector 400 that is mechanically and electrically connected to a lug 41 that projects radially from the brush holder ring 35. Each brush is normally yieldingly influenced inwardly of the corresponding brush holder ring by an arm 42 one end of which frictionally bears upon the corresponding brush while the other end has a bearing sleeve 43 riveted thereto and pivotally mounted on a stud 44 that is riveted in the brush holder ring 35. A torsional spring 45 surrounds the stud 44 with one end hooked over the corresponding arm 42 and its other end seated in a slot in the free end of the stud 44, so that the spring normally swings the arm 42 in the direction to press the corresponding brush in contact with its collector ring.

For convenience in connecting the spring 45 to the stud 44, the stud initially has a hole 46 drilled therethrough of a diameter greater than that of the wire of which the spring is formed, and then a slot 47 is cut through the end of the stud diagonally of the hole 46 and thereinto. The end of the spring is slipped through the slot 47, whereupon the tension thereon swings it into the hole 46 so that portions of the walls of the hole at the intersections of the sides of the slot with the hole overlie the end of the spring and hold it against displacement as shown in Figures 5 and 6.

Each brush holder also includes a radially projecting terminal lug 48 for connecting the brush holder in its circuit.

As shown, the upper brush holder cooperates with the collector ring 3 and its terminal lug 48 is connected to a ground strap 49. The brush holder for the collector ring 19 has its terminal lug 48 connected to the main circuit cable 50 so that said circuit is completed from the source through the cable E, the ring 19, the corresponding brush holder and the cable 50.

The terminal lugs 48 of the brush holders for the connector rings 23 are similarly connected to cables 51 for their respective circuits, so that said circuits will be completed from their sources through the cables F and the respective collector rings 23 of the brush holders and their cables 51.

Another feature of the invention is a casing for enclosing and electrically shielding the collector rings and brush holders. A part of this casing includes a U-shaped metal strap 52 that has the ends of its arms secured respectively to the top plate 4 and bottom plate 5 of the support C, as by the bolts 53, said strap extending radially from the plates 4 and 5 as most clearly shown in Figure 1. This strap has cable inlet openings 500 and 510 and also carries an arm 54 that is adapted to be engaged by a suitable clip 55 that may be fixedly mounted on the body of the tank so as to hold the support C against rotation.

The casing also includes two approximately semicylindrical complemental sections 56 each of which is hingedly connected along one longitudinal edge to the corresponding edge of the other as by hinges 57. The interior radius of each section 56 approximately corresponds to the external radius of the plates 4 and 5, so that the two sections may be swung together in surrounding relation to the edges of said plates as shown in the drawings. The ends of the sections 56 have inturned flanges 58 to overlie the outer sides of the top and bottom plates 4 and 5, and each section has a lateral extension 59 to abut the sides of the strap 52. Preferably said lateral extensions have inturned flanges 60 to overlie the outer side of the strap.

For connecting the two sections together in enclosing relation to the brush holders and collector rings, I have utilized swing bolts 61 one end of each of which is pivotally connected at 62 to one of the lateral extensions 59, while the other end is adapted to cooperate with a keeper plate 62 on the other extension 59. A nut 63 is provided on each swing bolt for drawing and holding the casing sections together.

With this construction, it will be observed that the collector rings and brushes may be wholly enclosed and protected against injury and from accumulations of dust and grease. Also the casing will effectually electrically shield the brushes and collector rings, the plate 25 and conducting ring 21 serving as a further electrical shield between the main power circuit and the other circuits. Preferably the strap 52 will have an inwardly projecting steel fin 64 in juxtaposed overlapping relation to the edge of the plate 25 for cooperation with said plate in completing the shield between the brush holders and brushes of the upper main power circuit from the brush holders and collector rings of the other circuits.

While I have shown and described the invention as embodied in certain details of structure and for particular purpose, it should be understood that the structural details of the collector mechanism may be modified and changed without departing from the spirit or scope of the invention and that the collector may be used for other purposes than that specifically described.

Having thus described my invention, what I claim is:

1. An electrical collector comprising a shaft, a support for brush holders including a pair of end plates spaced apart longitudinally of said shaft and a plurality of tie rods rigidly connecting said plates, a bearing between each of said plates and said shaft to permit relative rotation of said support and said shaft, a plurality of collector rings mounted on said shaft in spaced and insulated relation to each other longitudinally of said shaft and insulated therefrom, and a plurality of brush holders, one for each collector ring, rigidly mounted on and insulated from said tie rods and carrying brushes to contact with the corresponding collector rings.

2. An electrical collector comprising a shaft, a support for brush holders including a pair of end plates spaced apart longitudinally of said shaft and a plurality of tie rods rigidly connecting said plates, a combined collector and bearing ring rigidly mechanically and electrically connected to said shaft, one of said end plates having an integral bearing flange relatively rotatably cooperating with said collector and bearing ring, a bearing bushing secured to the other of said plates in coaxial relation to said bearing flange and relatively rotatably cooperating with said shaft, whereby to permit relative rotation of said shaft and said support, a plurality of collector rings mounted on and in insulated relation to said shaft and in spaced and insulated relation to each other and said combined collector and bearing ring and said bushing, and a plurality of brush holders, one for each collector ring, rigidly mounted on and insulated from said tie rods and carrying brushes to contact with the corresponding collector rings.

3. The electrical collector set forth in claim 2 with the addition of thrust bearing elements secured on said shaft and each abutting one end of said bearing bushing on the second-mentioned end plate to prevent relative longitudinal movement of said shaft and said support.

4. The electrical collector set forth in claim 1 with the addition of a conducting ring on said shaft intermediate the ends thereof and insulated from said collector rings, and a third plate rigidly connected to said tie rods and having an integral bearing flange relatively rotatably cooperating with said conducting ring to form an electrical shield.

5. The electrical collector set forth in claim 2 with the addition of a conducting ring on said shaft intermediate the ends thereof and insulated from said collector rings, and a third plate rigidly connected to said tie rods and having an integral bearing flange relatively rotatably cooperating with said conducting ring.

6. The electrical collector set forth in claim 1 with the addition of a casing element including hingedly connected metal sections complemental to each other for surrounding said end plates to enclose said collector rings and said brush holders and having end flanges to overlie the outer sides of the respective end plates, and fastening means for holding said sections in surrounding relation to said plates and brush holders, whereby said end plates serve as the ends and said sections serve as the side walls of a casing to electrically shield and to prevent accumulations of foreign matter on said collector rings and said brush holders.

7. The electrical collector set forth in claim 1 with the addition of a conducting ring on said shaft intermediate the ends thereof and insulated from said collector rings, and a third plate rigidly connected to said tie rods and having an integral bearing flange relatively rotatably cooperating with said conducting ring, a casing element including hingedly connected metal sections complemental to each other for surrounding said end plates to enclose said collector rings and said brush holders and having end flanges to overlie the outer sides of the respective end plates, and fastening means for holding said sections in surrounding relation to said plates and brush holders, whereby said end plates serve as the ends and said sections serve as the side walls of a casing to electrically shield and to prevent accumulation of foreign matter on said collector rings and said brush holders, and said third plate and said conducting ring also serve as a shield between the collector rings and brush holders at opposite sides of said third plate.

8. An electrical collector comprising a shaft, a support for brush holders including a pair of end plates spaced apart longitudinally of said shaft, a plurality of tie rods rigidly connecting said plates, a combined collector and bearing ring rigidly mechanically and electrically connected to said shaft, one of said end plates having an integral bearing flange relatively rotatably cooperating with said collector and bearing ring, a bearing bushing secured to the other of said plates in co-axial relation to said bearing flange and relatively rotatably cooperating with said shaft, whereby to permit relative rotation of said shaft and said support, a nut on said shaft in spaced relation to said combined collector and bearing ring, an insulating sleeve on said shaft, a plurality of collector rings and insulating rings mounted on said insulating sleeve in alternating relation between said combined collector and said nut whereby said collector rings and said insulating rings are clamped between said combined collector and bearing ring and said nut, and a plurality of brush holders, one for each collector ring, rigidly mounted on and insulated from said tie rods and carrying brushes to contact with the corresponding collector rings.

9. The electrical collector set forth in claim 8 wherein said nut abuts one end of said bearing bushing to form a thrust bearing for said support secured on said shaft, and with the addition of a flanged element on said shaft and abutting the other end of said bearing bushing, whereby to limit relative longitudinal movement of said shaft and said support.

10. The electrical collector set forth in claim 1 with the addition of a U-shaped strap having its arms secured respectively to said end plates and extending radially therefrom, said strap having openings for the passage of electrical cables to be connected to said brush holders, and a casing element including two sections complemental to each other for surrounding said end plates in abutting relation to the edges thereof to enclose said collector rings and said brush holders, one longitudinal edge of each section being hingedly connected to the corresponding edge of the other section and the other longitudinal edges of said sections having lateral extensions to abut the sides of said strap, the ends of said sections and said extensions having inturned flanges to overlie the outer sides of the respective end plates and said strap, and means for separably fastening together said extensions.

11. In an electrical collector, a tubular shaft, a ring surrounding and fixedly connected thereto, a nut on the shaft in spaced relation to said fixed ring, an insulating sleeve on said shaft between said fixed ring and said nut, and a plurality of collector rings and insulating rings mounted on said sleeve in alternating relation to each other to insulate said collector rings from each other and from said fixed ring and said nut, said collector rings and said insulating rings being clamped between said fixed ring and said nut, said shaft and said sleeve having alined transverse openings for electrical connection to the inner peripheries of said collector rings of the ends of cables that extend into said tubular shaft.

12. In an electrical collector, a support for brush holders comprising a pair of spaced rigidly connected plates each having an opening coaxial with the opening of the other, a plurality of brush holding rings rigidly mounted in said support between said end plates and coaxial with the said openings, and a casing element including two sections complemental to each other for surrounding said plates in abutting relation to the edges thereof to enclose said brush holding rings, one longitudinal edge of each section being hingedly connected to the corresponding edge of the other section, and means for separably fastening together the other longitudinal edges of said sections, whereby said plates form the ends and said sections form the side walls of a casing.

13. In an electrical collector as described in claim 12, the addition of integral end flanges on said casing sections overlying the outer sides of the respective said plates to hold said sections against longitudinal movement.

EMIL E. HOLLANDER.